(12) United States Patent
Choi et al.

(10) Patent No.: US 7,497,468 B2
(45) Date of Patent: Mar. 3, 2009

(54) AIRBAG INFLATION DEFLECTION MODULE

(75) Inventors: Changsoo Choi, Rochester, MI (US); Timothy A. DePottey, Flint, MI (US)

(73) Assignee: Autoliv ASP, Inc., Ogden, UT (US)

( * ) Notice: Subject to any disclaimer, the term of this patent is extended or adjusted under 35 U.S.C. 154(b) by 401 days.

(21) Appl. No.: 11/127,936

(22) Filed: May 12, 2005

(65) Prior Publication Data

US 2006/0255578 A1 Nov. 16, 2006

(51) Int. Cl.
*B60R 21/26* (2006.01)
(52) U.S. Cl. ..................................... 280/740
(58) Field of Classification Search ................. 280/740, 280/736, 728.1, 727, 742
See application file for complete search history.

(56) References Cited

U.S. PATENT DOCUMENTS

| | | | | |
|---|---|---|---|---|
| 4,836,576 A | | 6/1989 | Werner et al. ............... 280/731 |
| 5,407,226 A | * | 4/1995 | Lauritzen et al. ......... 280/728.1 |
| 5,437,472 A | * | 8/1995 | Kuretake et al. ............. 280/737 |
| 5,542,692 A | * | 8/1996 | Shaklik et al. ........... 280/728.2 |
| 5,588,676 A | * | 12/1996 | Clark et al. .................. 280/741 |
| 5,720,493 A | * | 2/1998 | Sugiyama et al. ........... 280/731 |
| 5,836,608 A | * | 11/1998 | Soderquist et al. ....... 280/728.2 |
| 5,860,672 A | | 1/1999 | Peterson ..................... 280/728 |
| 5,884,939 A | * | 3/1999 | Yamaji et al. ............. 280/743.1 |
| 5,904,366 A | * | 5/1999 | Nishijima et al. ........ 280/728.2 |
| 5,967,551 A | * | 10/1999 | Newkirk et al. ............. 280/740 |
| 5,992,874 A | * | 11/1999 | Sugiyama et al. ........ 280/728.2 |
| 6,089,600 A | * | 7/2000 | Schenck et al. ............. 280/740 |
| 6,149,192 A | * | 11/2000 | Swann et al. ................ 280/740 |
| 6,155,599 A | * | 12/2000 | Bowers et al. .............. 280/740 |
| 6,340,174 B1 | | 1/2002 | Takagi et al. ................ 280/736 |
| 6,439,603 B2 | * | 8/2002 | Damman et al. ............ 280/736 |
| 7,121,576 B2 | * | 10/2006 | DePottey et al. .......... 280/728.2 |
| 2001/0040366 A1 | | 11/2001 | Miodek et al. .............. 280/740 |
| 2002/0149185 A1 | * | 10/2002 | Lutz et al. ................... 280/740 |
| 2004/0080146 A1 | * | 4/2004 | Lutz et al. ................... 280/736 |
| 2004/0090049 A1 | * | 5/2004 | McCann et al. .......... 280/728.2 |
| 2005/0029784 A1 | * | 2/2005 | Siegel et al. ................. 280/736 |
| 2005/0052008 A1 | * | 3/2005 | Rose et al. ................... 280/740 |
| 2005/0073139 A1 | * | 4/2005 | Fischer et al. ............... 280/740 |
| 2005/0156419 A1 | * | 7/2005 | Gabler et al. ................ 280/740 |
| 2005/0212274 A1 | * | 9/2005 | Massanetz et al. .......... 280/740 |
| 2005/0248132 A1 | * | 11/2005 | Wheelwright ............... 280/729 |
| 2006/0006633 A1 | * | 1/2006 | Bito ............................ 280/740 |
| 2006/0028008 A1 | * | 2/2006 | Magoley et al. ............. 280/736 |
| 2006/0175809 A1 | * | 8/2006 | Yamaji et al. ............... 280/729 |
| 2006/0249932 A1 | * | 11/2006 | Marriott ...................... 280/729 |
| 2006/0255578 A1 | * | 11/2006 | Choi et al. ................... 280/740 |
| 2007/0126220 A1 | * | 6/2007 | Huber et al. ................. 280/740 |
| 2007/0200327 A1 | * | 8/2007 | Kloss et al. ................. 280/740 |
| 2007/0228701 A1 | * | 10/2007 | Yamamura ............... 280/730.2 |
| 2007/0252369 A1 | * | 11/2007 | Thomas ....................... 280/740 |
| 2008/0073892 A1 | * | 3/2008 | Rose et al. ................... 280/739 |
| 2008/0252053 A1 | * | 10/2008 | Schneider et al. ........... 280/742 |

* cited by examiner

FOREIGN PATENT DOCUMENTS

DE        37 07370        9/1988

*Primary Examiner*—John Q Nguyen
*Assistant Examiner*—Karen Amores
(74) *Attorney, Agent, or Firm*—Sally J. Brown; Stoel Rives, LLP

(57) ABSTRACT

An airbag inflation deflection device and airbag module is disclosed. The deflection device may be a deflection hood that covers a portion of the airbag inflator, and is positioned adjacent inflator exit ports to initially deflect inflation gas away from an intended occupant position. The airbag module also includes a housing that may have side wells on either side of the inflator, in which the deflection hood initially deflects the inflation gas. The housing and deflection hood in combination may direct a majority of the inflation gas into the lateral portions of the airbag instead of into the center portion.

12 Claims, 6 Drawing Sheets

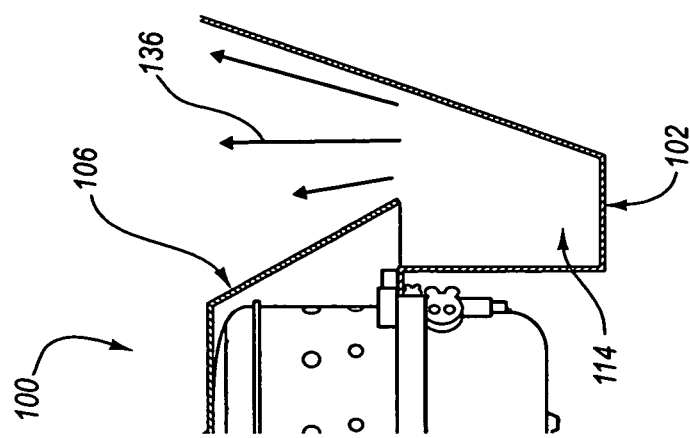
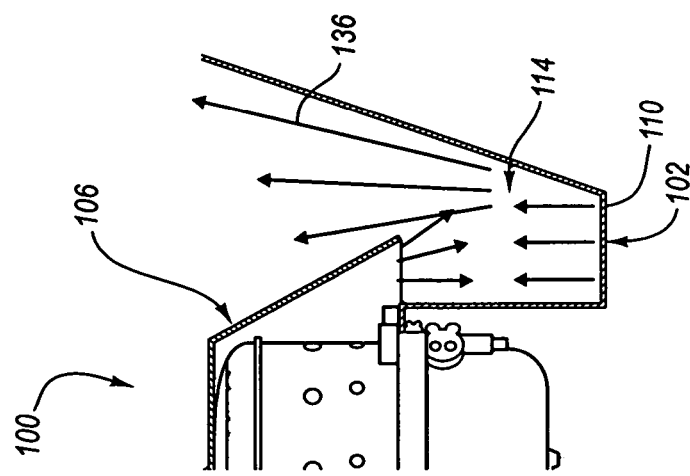
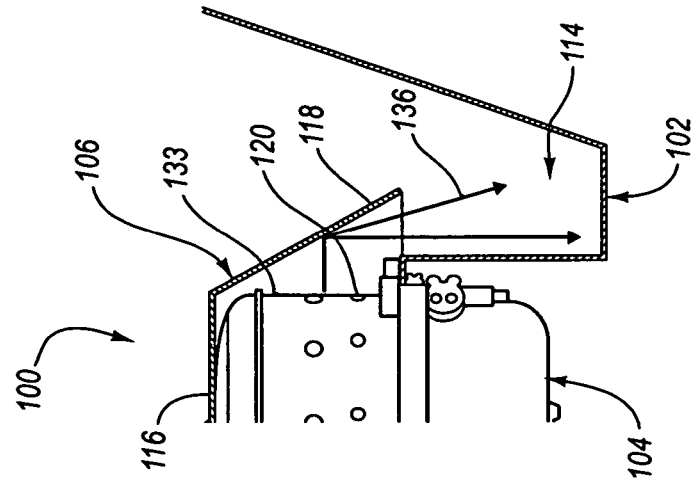

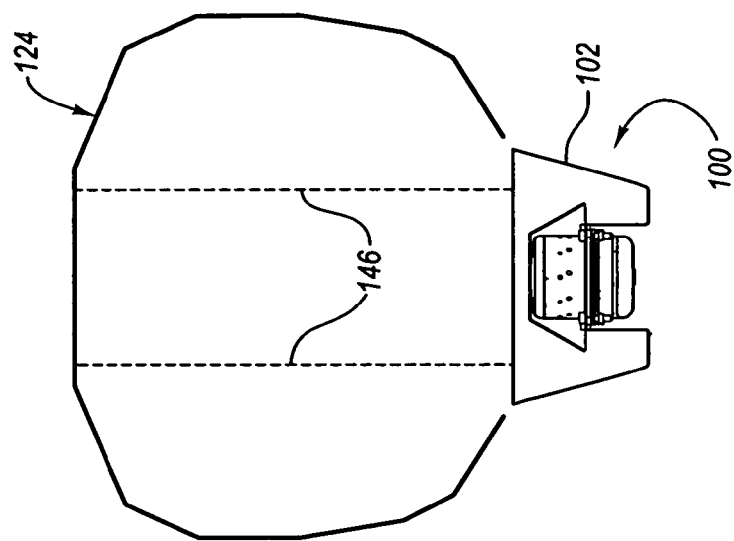
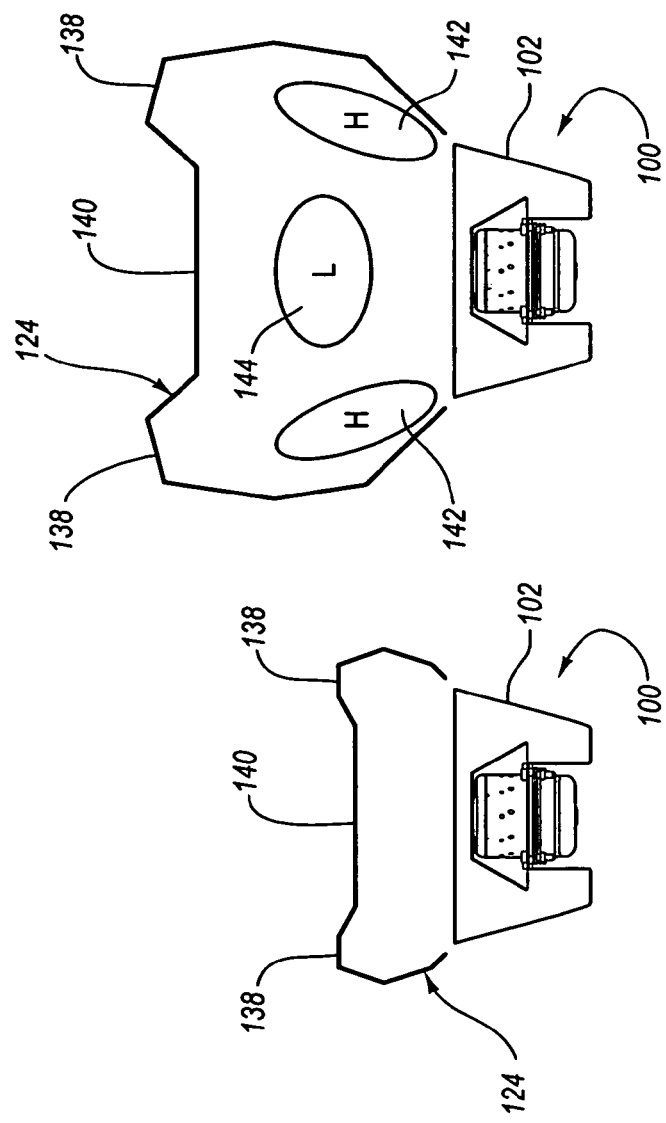
Fig. 5C
Fig. 5B
Fig. 5A

AIRBAG INFLATION DEFLECTION MODULE

TECHNICAL FIELD

The present disclosure relates generally to the field of automotive protective systems. More specifically, the present disclosure relates to airbag inflation modules designed to deflect a flow of inflation gas.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the invention's scope, the embodiments will be described and explained with specificity and detail in reference to the accompanying drawings in which:

FIG. 4A is a partially cut-away side cross sectional view of the airbag module of FIG. 3 during a first inflating stage immediately after activation of the inflator as inflation gas is directed into side wells of the housing;

FIG. 4B is a partially cut-away side cross sectional view of the airbag module of FIG. 3 during a second inflating stage as inflation gas is directed into and out of side wells of the housing;

FIG. 4C is a partially cut-away side cross sectional view of the airbag module of FIG. 3 during a third inflating stage as inflation gas begins to exit the housing;

FIG. 5A is a side cross sectional view of an airbag module during a first deploying phase of an airbag cushion;

FIG. 5B is a side cross sectional view of the airbag module of FIG. 5A during a second deploying phase of the airbag cushion;

FIG. 5C is a side cross sectional view of the airbag module of FIG. 5A during a third deploying phase of the airbag cushion.

DETAILED DESCRIPTION OF PREFERRED EMBODIMENTS

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the invention, as claimed, but is merely representative of various embodiments of the invention. While the various aspects of the embodiments are presented in drawings, the drawings are not necessarily drawn to scale unless specifically indicated.

The phrases "connected to" and "coupled to" refer to any form of interaction between two or more entities, including mechanical, electrical, magnetic, electromagnetic, fluid, and thermal interaction. Two components may be coupled to each other even though they are not in direct contact with each other.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not necessarily be attached together.

Figure 1B:
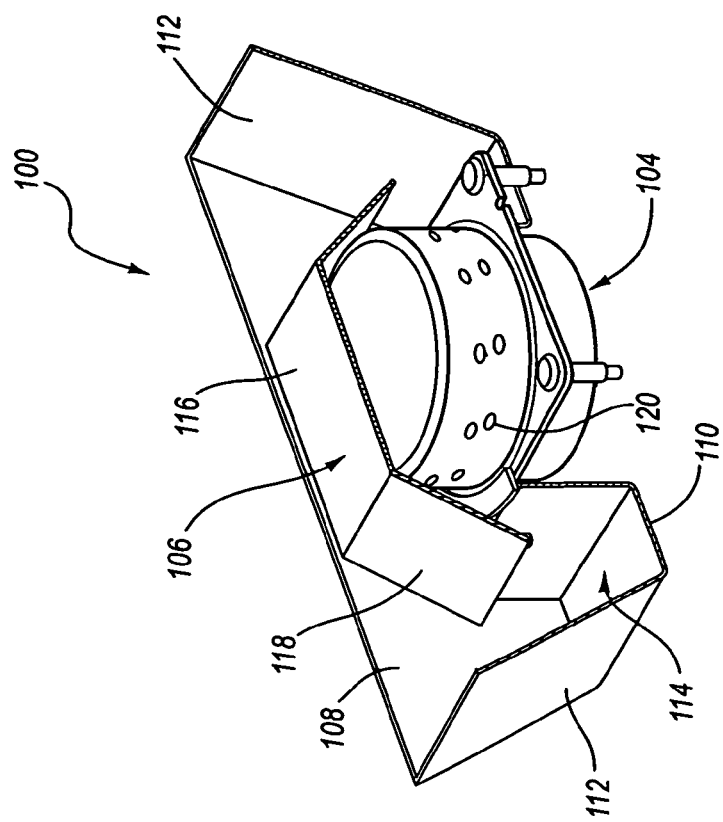
FIG. 1B is a partially cut away perspective view of the airbag module of FIG. 1A.
Figure 1A:
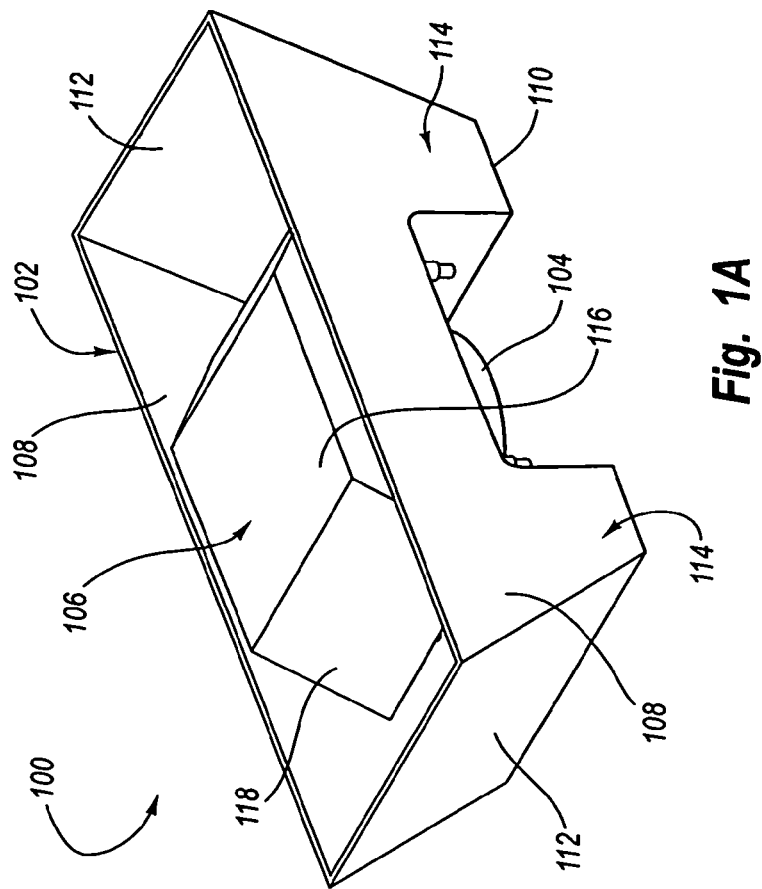
FIG. 1A is a perspective view of an airbag module having a housing, inflator, and deflection hood.

FIG. 1A represents one embodiment an airbag module 100 as shown from a perspective view. The airbag module 100 includes a housing 102, an inflator 104, and a deflection hood 106. FIG. 1B represents the airbag module 100 of FIG. 1A, as shown from a partially-cut away perspective view. The inflator 104 shown in FIG. 1B is not cut away as is the housing 102 and deflection hood 106.

Referring to FIGS. 1A and 1B, the housing 102 of the airbag module 100 may have a pair of longitudinal panels 108 on either side of the inflator 104 and deflection hood 106. The longitudinal panels 108 include a bottom edge 110 that may form an outline which is essentially W-shaped. The housing 102 also may include side walls 112 that extend from adjacent the bottom edge 110 of the longitudinal panels 108 and slope outwardly, away from the inflator 104, which may be located at a center portion of the housing 102.

The longitudinal panels 108 and side walls 112 of the housing 102 define side wells 114 on either side of the inflator 104. The side wells 114 define a space that exists between the inflator 104 and the side walls 112 where inflation gas may be deflected into by the deflection hood 106. In the embodiment identified at 100, side wells 114 exist on two opposite sides of the inflator 104. However, other configurations may be envisioned by one having skill in the art based on this disclosure.

According to the embodiment depicted, the airbag module 100 is a passenger airbag module that is configured to be mounted within an instrument panel (not shown) of a vehicle. This may be accomplished through a variety of methods, such as flanges (not shown) that may be fastened or otherwise attached to the instrument panel. The flanges may extend laterally from the outside of the housing 102. The airbag module 100 may also include a bracket (not shown) extending from the bottom portion of the airbag module 100 for mounting to a portion of the vehicular frame or similar stable structure.

Referring still to FIGS. 1A and 1B, the deflection hood 106 of the airbag module 100 may be positioned within the housing 102 such that it covers a top portion of the inflator 104. The deflection hood 106 may have a top portion 116 that is located above the inflator 104 adjacent to a top edge of the housing 102. The top portion 116 of the deflection hood 106 may be located in a center portion of the housing 102, such that it is substantially equidistant from the side walls 112 of the housing 102 leaving a space there between for inflation gas to exit the housing 102. The deflection hood may also extend from adjacent one longitudinal panel 108 to the opposite longitudinal panel 108, such that there is not a significant space there between for inflation gas to escape.

The deflection hood 106 also may include side portions 118 that extend from the top portion 116, and slope downward toward the side wells 114 of the housing 102. The side portions 118 are positioned adjacent the inflator 104 and its exit ports 120 which are disposed thereon. The side portions 118 serve to deflect inflation gas that escapes from the exit ports 120 into the side wells 114 of the housing 102. This particular configuration of the deflection hood 106 with the inflator 104 yields a mushroom-shaped deflection device that directs inflation gas from the inflator 104 towards the bottom of the housing 102.

Figure 2:
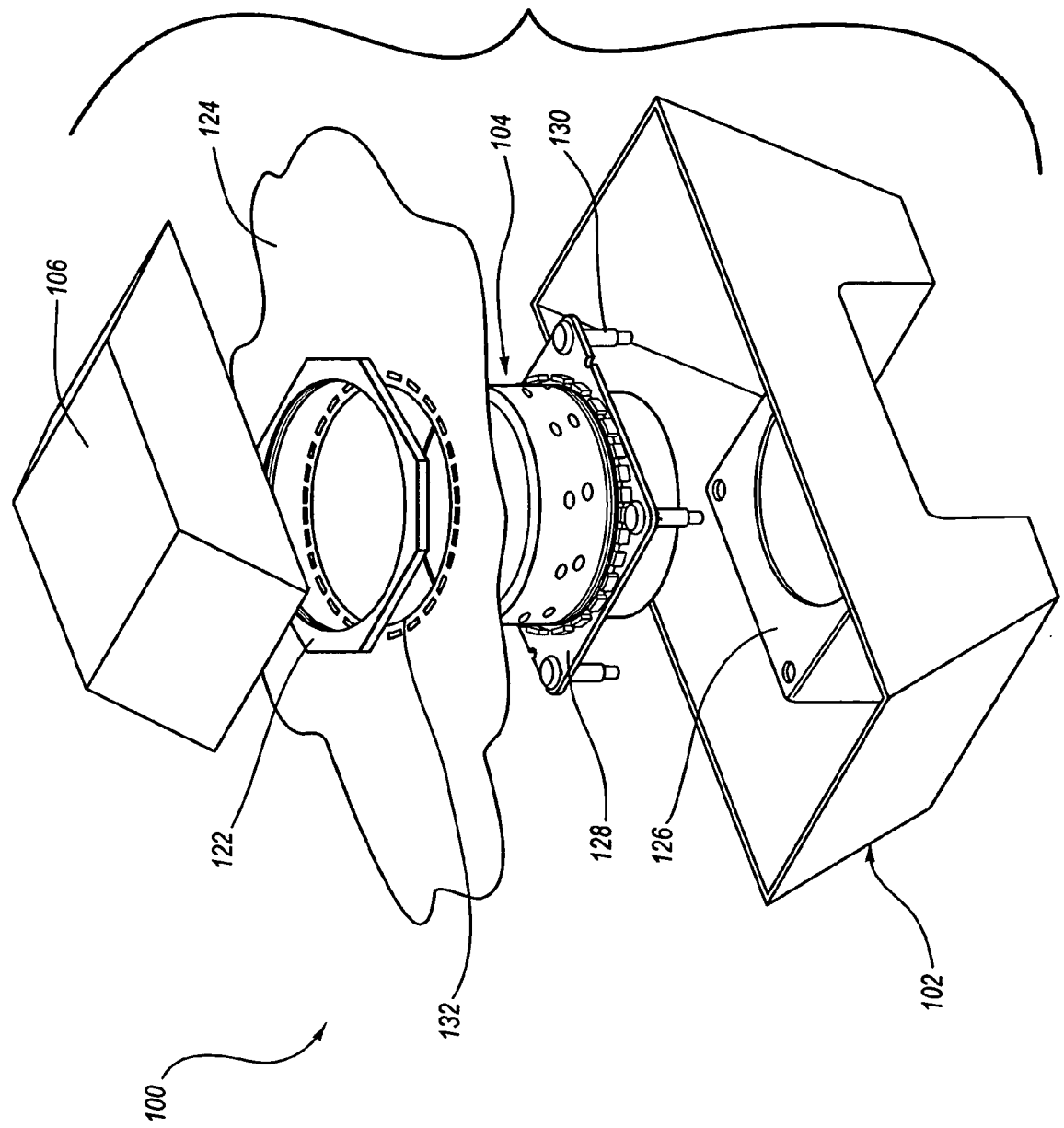
FIG. 2 is an exploded perspective view of an airbag module including an inflator, retaining ring, housing, airbag and deflection hood.

FIG. 2 depicts the various components of the airbag module 100 as shown from an exploded perspective view. The airbag module 100 depicted includes a deflection hood 106, a retainer ring 122, an airbag cushion 124, an inflator 104 and a housing 102. The housing 102 may include an inflator mounting plate 126 in a center portion of the housing 102 to which the inflator 104 may be mounted. The inflator 104 may include a flange 128 to abut the mounting plate 126 of the housing 102. The inflator 104 may be attached directly to the housing through the use of fasteners 130.

The airbag cushion 124 has a mouth 132 which receives a portion of the inflator 104, so that inflation gas exiting there from may be directed into the cushion 124. The airbag cushion 124 illustrated is shown in a partially cut-away view. The mouth 132 of the airbag cushion 124 may be sized to fit securely around the inflator 104, such that it cannot fit over the inflator flange 128. The retaining ring 122 operates to secure the airbag cushion mouth 132 in place adjacent the inflator flange 128 so that during activation of the inflator 104, the airbag cushion mouth 132 does not blow off of the inflator 104. In addition to directing gas flow from the inflator 104, the housing 102 also encloses a portion of the airbag cushion 124 or alternatively, the entire cushion 124, when the airbag cushion 124 is in an uninflated or undeployed state.

The retaining ring 122 may optionally be fitted with fasteners or similar devices for securing to the inside of the deflection hood 106 and to the airbag cushion 124 and flange 128 of the inflator 104. The deflection hood 106 is also secured to the retaining ring 122 and thereby indirectly coupled to the inflator flange 128 and mounting plate 126 of the housing 102. However, alternative configurations may be employed as apparent to those having skill in the art. Different methods of attachment of the airbag cushion 124 about the inflator may be used as well as attachment of the deflection hood 106 and other components heretofore described.

Figure 3:
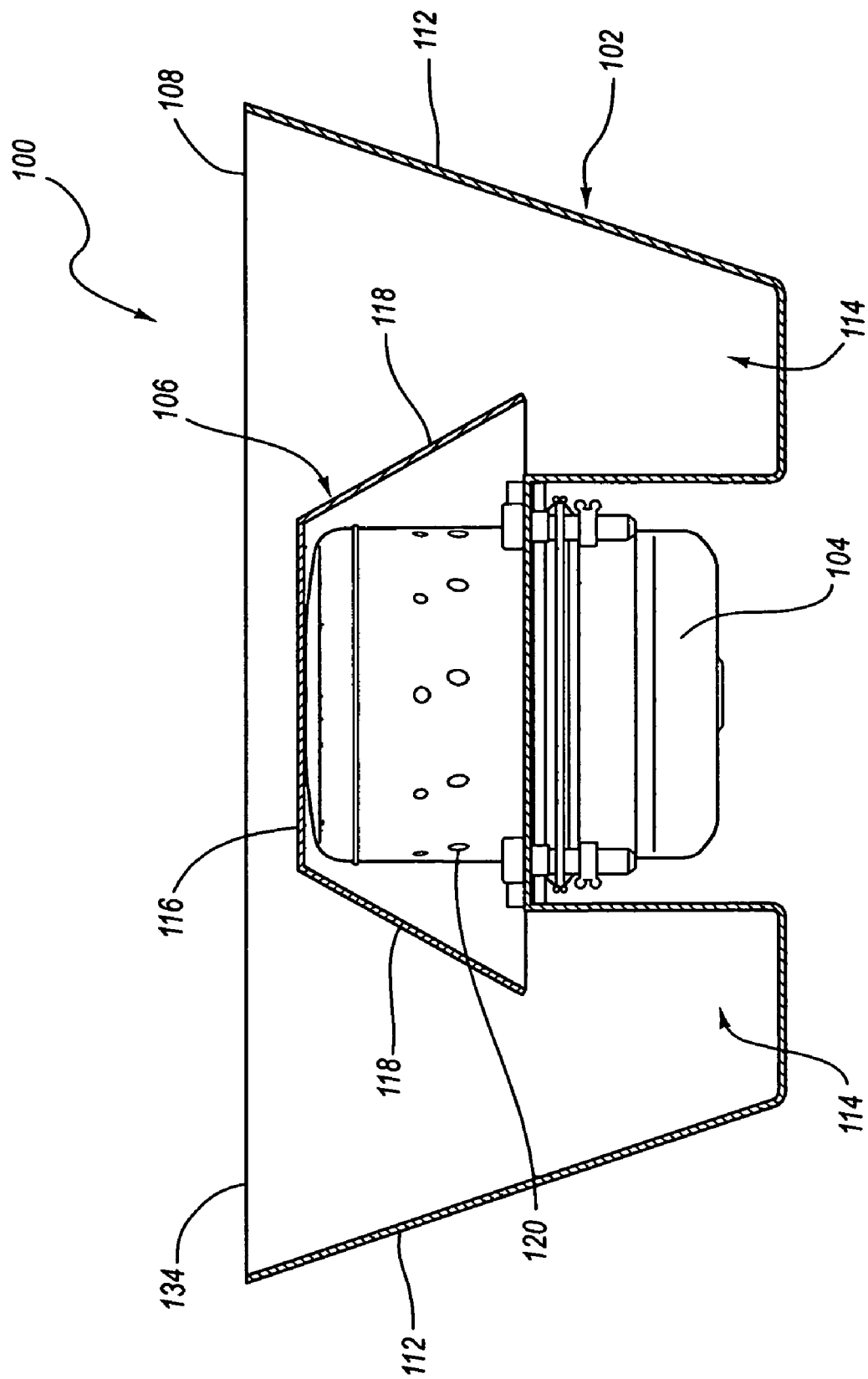
FIG. 3 is a side cross sectional view of an airbag module having a housing, deflection hood and inflator.

FIG. 3 represents the airbag module 100 from a side cross sectional view. The inflator 104, however, has not been cross sectioned as has the housing 102 and the deflection hood 106. The deflection hood 106 has a top portion 116 that is located above and covers a portion of the inflator 104. The deflection hood 106 also includes side portions 118 that extend from the top portion 116, and slope downward toward the side wells 114 of the housing 102 and away from the inflator 104. The side portions 118 are positioned adjacent the inflator 104 and its exit ports 120 which are disposed thereon. The side portions 118 serve to deflect inflation gas evenly into both side wells 114 of the housing 102. The deflection hood 106 may divide the inflation gas into two approximately equal flow streams into each of the side wells 114 of the housing 102.

The housing side wells 114 are located on either side of the inflator 104. The configuration of the housing 102 functions to encase a portion of the inflator 104, leaving another portion of the inflator exposed for electrical connection to the collision detection system (not shown). The side wells 114 of the housing 102 are defined by longitudinal panels 108 and side walls 112. The side walls 112 may slope upwardly and away from the inflator 104 or center of the housing 102. This particular configuration gives the cross section of the housing 102 a configuration which is essentially W-shaped. Alternatively, the housing 102 may have a curved or rounded shape to its side wells. Additional alternative configurations would be apparent to those having skill in the art with the aid of the present disclosure.

The airbag cushion (not shown) deploys out a top 134 of the housing 102 toward the intended position of a vehicular occupant. The deflection hood 106 channels the inflation gas that exits the inflator 104 upon activation evenly into the side wells 114 which are in a direction opposite from the intended occupant position or direction of deployment of the airbag cushion.

FIG. 4A shows the airbag module 100 of FIG. 3 from a partially cut-away side cross sectional view during a first inflating stage immediately after activation of the inflator 104. Once the collision detection system (not shown) senses a collision event, the inflator 104, which may be a pyrotechnic device, is activated and rapidly generates inflation gas. The inflation gas, shown by arrows 136, escapes the inflator 104 through exit ports 120 on the inflator side walls 133.

As the inflation gas 136 exits the inflator 104, the flow is typically laminar. The inflation gas 136 then impinges against the side portion 118 of the deflection hood 106. The deflection hood side portion 118 extends from the top portion 116, and slopes downward toward the side wells 114 of the housing 102 and away from side walls 133 of the inflator 104. The side portion 118 of the deflection hood 106 deflects the inflation gas 136 downward into the housing, in a direction opposite from the intended occupant position and direction of airbag deployment. The inflation gas 136 is directed into the side wells 114 of the housing 102.

FIG. 4B shows the airbag module 100 of FIG. 3 from a partially cut-away side cross sectional view during a second inflating stage, as inflation gas 136 is directed into the side wells 114 of the housing 102. During this second inflating stage, inflation gas 136 mixes in the side well 114 as it impinges against the bottom edge 110 of the housing 102 and begins to exit the housing through its top. During this stage of inflation, the flow of inflation gas 136 may be turbulent instead of laminar. According to the configuration of the airbag module 100 depicted, there is a de-coupling between the supplied inflation gas 136 and its influence on an out-of-position occupant by virtue of the inflation gas 136 being deflected twice, i.e., at least once by the deflection hood 106 and at least once by the housing 102 before the inflation gas 136 exits. This reduces inflation aggressiveness of the airbag on an out-of-position occupant.

FIG. 4C shows the airbag module 100 of FIG. 3 from a partially cut-away side cross section view during a third inflating stage, as inflation gas 136 begins to exit the housing 102. During the third inflating stage, the inflation gas 136 that has been deflected by the deflection hood 106 and into the side wells 114 are directed out of the top of the housing 102 and into lateral portions of the airbag cushion (not shown). The inflation gas 136 exiting the housing 102 has typically been deflected at least twice and its flow is typically turbulent.

FIG. 5A represents an airbag module 100 during a first deploying phase of an airbag cushion 124 as shown from a side cross sectional view. As inflation gas exits the housing 102, the majority of the inflation gas is directed into the lateral portions 138 of the airbag cushion 124 as compared to the cushion's center portion 140. This concentrates the majority of the force of the deploying airbag into the lateral portions 138. Consequently, during the first deploying phase the airbag cushion 124 surface may be concave or have a flat profile. This contrasts with conventional systems, where the surface of the airbag is convex during the first phase of deployment, where the force of the deploying airbag is concentrated in the center portion 140.

FIG. 5B represents the airbag module 100 of FIG. 5A during a second deploying phase of the airbag cushion 124 as shown from a side cross sectional view. During the second deploying phase, the greater volume and pressure of the inflation gas that was directed into the lateral portions 138 of the cushion 124 creates a zone of high pressure 142 in each of the lateral portions 138. This leaves a zone of lower pressure 144 in the center portion 140 of the airbag cushion 124. Since vehicular occupants are typically located where the center portion 140 of the cushion 124 deploys, having a zone of lower pressure 144 in the cushion's center portion 140 mitigates the undesirable effects of punch-out loading and membrane-loading, as well as bag slap on the occupant. This contrasts with conventional systems, where the deploying cushion 124 is often skewered during the second phase of deployment because a large zone of high pressure exists in the center portion 140 of the cushion 124.

During the second deploying phase of the airbag cushion 124, the shape of the cushion 124 may be similar to that of the first phase (shown in FIG. 5A), or alternatively, could have a center portion 140 that is increasingly deepened with respect to the lateral portions 138. Furthermore, during the second deploying phase, the high and low pressure zones 142, 144 may begin to mix leading to an even pressure distribution throughout the airbag cushion 124 in the next phase.

FIG. 5C represents the airbag module 100 of FIG. 5A during a third deploying phase as shown from a side cross sectional view. The third deploying phase is when the airbag cushion 124 has been fully deployed, having its designed shape which may be similar to that of conventional airbags. The shape of the airbag cushion 124 may be controlled by internal tethers 146 that are optionally disposed within the airbag cushion 124. During the third deploying phase, the high and low pressure zones 142, 144 that existed in the second deploying phase (see FIG. 5B), have been mixed such that there exists a relatively even pressure distribution throughout the airbag cushion 124.

Figure 6:
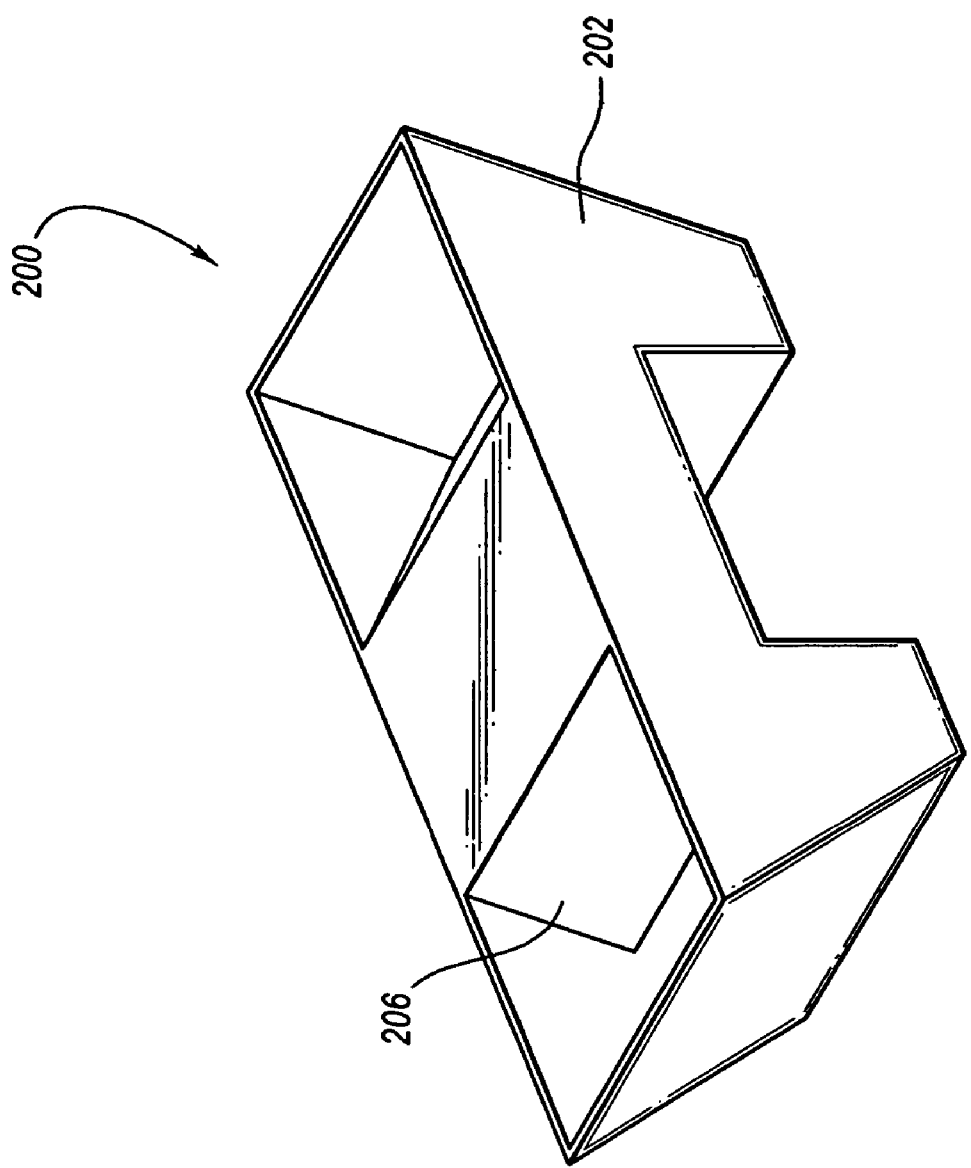
FIG. 6 is a perspective view of an alternative embodiment of an airbag module.

FIG. 6 represents an alternative embodiment of an airbag module 200 absent an inflator, as shown from a perspective view. The airbag module 200 may include a housing 202 and a deflection hood 204. The housing 202 and deflection hood 204 may be integrated, such that the deflection hood 204 is not a separately removable piece from the housing 202, but may be formed as part of the housing 202.

Referring to FIGS. 1A through 6 generally, the present disclosure provides for a method for reducing inflation aggressiveness in an inflatable airbag system. First, an inflator 104 is initiated to produce inflation gas 136, such as in response to a signal from a collision sensing system. The inflation gas 136 is deflected in a direction away from an intended occupant position. The inflation gas 136 may also be divided into two flow streams. A turbulent flow of inflation gas 136 is created. The inflation gas 136 is channeled into lateral portions 138 of an airbag cushion 124. It should be apparent that each step or action of the methods described herein may be changed by those skilled in the art and still achieve the desired result. Thus, any order in the detailed description is for illustrative purposes only and is not meant to imply a required order.

The airbags and airbag cushions disclosed herein are examples of means for cushioning a vehicular occupant during a collision event. Furthermore, the inflators disclosed are examples of means for inflating the cushioning means into a deployed state. The housings disclosed herein are to be considered examples of means for housing the inflating means and the cushioning means in an undeployed state. Moreover, the deflection hoods are examples of means for deflecting inflation gas generated by the inflating means.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. Note that elements recited in means-plus-function format are intended to be construed in accordance with 35 U.S.C. § 112 ¶6. The scope of the invention is therefore defined by the following claims.

The invention claimed is:

1. An airbag module comprising:
    an inflatable airbag cushion;
    an inflator configured to inflate the cushion with inflation gas;
    a housing that encases at least a portion of the inflator and at least a portion of the cushion when the cushion is in an uninflated state; and
    a deflection device comprising a top portion that covers at least a portion of the inflator and a surface that slopes away from the inflator, wherein the deflection device is configured to deflect inflation gas in a direction away from a direction of airbag deployment,
    wherein the housing defines side wells on either side of the inflator and the deflection device is shaped to deflect the inflation gas into the side wells of the housing, and wherein the housing is shaped to direct a greater volume of inflation gas into lateral portions of the cushion than into a center portion of the cushion as the cushion is inflated.

2. The airbag module of claim 1, wherein the deflection device is shaped to divide the inflation gas into two flow streams directed into each side well of the housing.

3. The airbag module of claim 1, wherein the airbag module is a passenger side airbag module.

4. The airbag module of claim 1, wherein the deflection device comprises side portions adjacent exit ports on the inflator to initially deflect the inflation gas in a direction away from an intended occupant position.

5. The airbag module of claim 4, wherein the housing includes side walls that define side wells on either side of the inflator, the side walls sloping away from the inflator.

6. The airbag module of claim 1, wherein the deflection device deflects the inflation gas downward into the housing upon activation of the inflator.

7. The airbag module of claim 1, wherein the deflection device and the housing are integrated.

8. An airbag module comprising:
    means for cushioning a vehicular occupant during a collision event, the cushioning means capable of transitioning from an undeployed state to a deployed state;
    means for inflating the cushioning means into the deployed state, the inflating means capable of generating inflation gas;
    means for housing the inflating means and for housing the cushioning means in the undeployed state; and
    means for deflecting substantially all of the inflation gas generated by the inflating means in a direction opposite from a direction of deployment of the cushioning means, wherein at least a portion of the means for deflecting the inflation gas slopes away from the means for inflating, wherein the housing means includes side wells on either side of the inflating means, and the housing means further includes side walls defining the side wells and sloping away from the inflating means, wherein the deflecting means deflects the inflation gas into each of the side wells, and wherein the housing means and deflecting means in combination direct a greater portion of the inflation gas into side portions of the cushioning means compared to a center portion of the cushioning means.

9. The airbag module of claim 1, wherein the housing defines a top edge and a bottom, wherein the bottom is further from an intended occupant position than is the top edge, and wherein the deflection device is configured to deflect inflation gas exiting the inflator toward the bottom of the housing.

10. The airbag module of claim 1, wherein the top portion of the deflection device is positioned between the inflator and an intended occupant position.

11. The airbag module of claim 1, wherein the deflection device comprises side portions extending from the top portion in a direction away from both the inflator and the intended occupant position.

12. The airbag module of claim 11, wherein the deflection device is configured to redirect substantially all inflation gas generated by the inflator in a direction away from a direction of airbag deployment.

* * * * *